(12) United States Patent
Tamilarasan et al.

(10) Patent No.: US 10,936,229 B1
(45) Date of Patent: Mar. 2, 2021

(54) SIMULATING LARGE DRIVE COUNT AND DRIVE SIZE SYSTEM AND METHOD

(71) Applicant: EMC IP Holding Company, LLC, Hopkinton, MA (US)

(72) Inventors: Ashok Tamilarasan, Shrewsbury, MA (US); Dmitri Prilepski, Upton, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 179 days.

(21) Appl. No.: 15/664,564

(22) Filed: Jul. 31, 2017

(51) Int. Cl.
*G06F 3/06* (2006.01)

(52) U.S. Cl.
CPC .......... *G06F 3/0644* (2013.01); *G06F 3/0604* (2013.01); *G06F 3/067* (2013.01); *G06F 3/0664* (2013.01)

(58) Field of Classification Search
None
See application file for complete search history.

(56) References Cited

U.S. PATENT DOCUMENTS

| | | | | |
|---|---|---|---|---|
| 5,088,058 A | * | 2/1992 | Salsburg | G06F 11/3414 703/25 |
| 2004/0254777 A1 | * | 12/2004 | Foreman | G06F 11/261 703/21 |
| 2005/0049848 A1 | * | 3/2005 | Dai | G06F 3/0664 703/24 |
| 2012/0096059 A1 | * | 4/2012 | Shimizu | G06F 3/061 707/828 |

* cited by examiner

*Primary Examiner* — Gary W. Cygiel
(74) *Attorney, Agent, or Firm* — Brian J. Colandreo; Mark H. Whittenberger; Holland & Knight LLP

(57) ABSTRACT

A method, computer program product, and computer system for forming, by a computing device, one or more virtual storage arrays using one or more storage processor virtual machines. A storage stack may be run inside the one or more storage processor virtual machines. One or more storage device drives of the one or more virtual storage arrays may be simulated as files.

18 Claims, 8 Drawing Sheets

US 10,936,229 B1

SIMULATING LARGE DRIVE COUNT AND DRIVE SIZE SYSTEM AND METHOD

BACKGROUND

Generally, with the increasing amounts of information being stored, it may be beneficial to efficiently store and manage that information. While there may be numerous techniques for storing and managing information, each technique may have tradeoffs between reliability and efficiency.

BRIEF SUMMARY OF DISCLOSURE

In one example implementation, a method, performed by one or more computing devices, may include but is not limited to forming, by a computing device, one or more virtual storage arrays using one or more storage processor virtual machines. A storage stack may be run inside the one or more storage processor virtual machines. One or more storage device drives of the one or more virtual storage arrays may be simulated as files.

One or more of the following example features may be included. The files may include thin files. The files simulating the one or more storage device drives may be stored in a server. The files may be consumed at a lower layer of the storage stack. The files may be exposed as the one or more storage device drives to an upper layer of the storage stack. The files may be hosted locally. The files may be hosted on one or more volumes exported by a backend datastore.

In another example implementation, a computing system may include one or more processors and one or more memories configured to perform operations that may include but are not limited to forming one or more virtual storage arrays using one or more storage processor virtual machines. A storage stack may be run inside the one or more storage processor virtual machines. One or more storage device drives of the one or more virtual storage arrays may be simulated as files.

One or more of the following example features may be included. The files may include thin files. The files simulating the one or more storage device drives may be stored in a server. The files may be consumed at a lower layer of the storage stack. The files may be exposed as the one or more storage device drives to an upper layer of the storage stack. The files may be hosted locally. The files may be hosted on one or more volumes exported by a backend datastore.

In another example implementation, a computer program product may reside on a computer readable storage medium having a plurality of instructions stored thereon which, when executed across one or more processors, may cause at least a portion of the one or more processors to perform operations that may include but are not limited to forming one or more virtual storage arrays using one or more storage processor virtual machines. A storage stack may be run inside the one or more storage processor virtual machines. One or more storage device drives of the one or more virtual storage arrays may be simulated as files.

One or more of the following example features may be included. The files may include thin files. The files simulating the one or more storage device drives may be stored in a server. The files may be consumed at a lower layer of the storage stack. The files may be exposed as the one or more storage device drives to an upper layer of the storage stack. The files may be hosted locally. The files may be hosted on one or more volumes exported by a backend datastore.

The details of one or more example implementations are set forth in the accompanying drawings and the description below Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
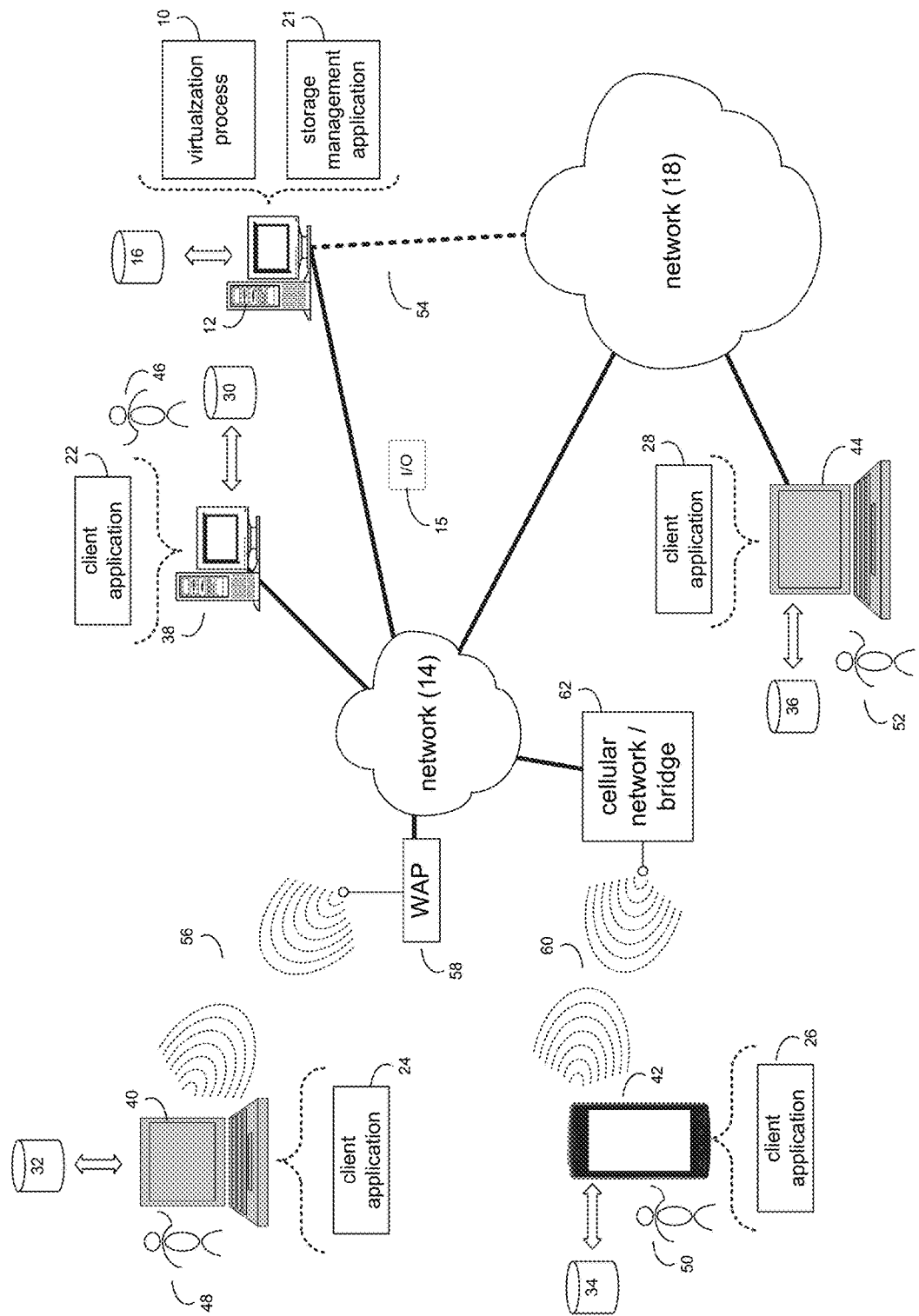
FIG. 1 is an example diagrammatic view of a virtualization process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electro-magnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown virtualization process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAM device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc, in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, an virtualization process, such as virtualization process 10 of FIG. 1, may form, by a computing device, one or more virtual storage arrays using one or more storage processor virtual machines. A storage stack may be run inside the one or more storage processor virtual machines. One or more storage device drives of the one or more virtual storage arrays may be simulated as files.

In some implementations, the instruction sets and subroutines of virtualization process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, virtualization process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network. An example cloud computing environment that may be used with the disclosure may include but is not limited to, e.g., Elastic Cloud Storage (ECS™) from Dell EMC™ of Hopkinton, Mass. In some implementations, other cloud computing environments may be used without departing from the scope of the disclosure.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, virtualization process 10 and/or storage management application 21 may be accessed via one or more of client applications 22, 24, 26, 28. In some implementations, virtualization process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within virtualization process 10, a component of virtualization process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of virtualization process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations; one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a media (e.g., video, photo, etc.) capturing device; and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of virtualization process 10 (and vice versa). Accordingly, in some implementations, virtualization process 10 may be a purely server-side application, a purely client-side application, or a hybrid server-side/client-side application that is cooperatively executed by one or more of client applications 22, 24, 26, 28 and/or virtualization process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side client-side application that is cooperatively executed by one or more of client applications 22, 24, 26, 28 and/or storage management application 21. As one or more of client applications 22, 24, 26, 28, virtualization process 10, and storage management application 21, taken singly or in any combination, may effectuate some or all of the same functionality, any description of effectuating such functionality via one or more of client applications 22, 24, 26, 28, virtualization process 10, storage management application 21, or combination thereof, and any described interaction(s) between one or more of client applications 22, 24, 26, 28, virtualization process 10, storage management application 21, or combination thereof to effectuate such functionality, should be taken as an example only and not to limit the scope of the disclosure.

In some implementations, one or more of users 46, 48, 50, 52 may access computer 12 and virtualization process 10 (e.g., using one or more of client electronic devices 38, 40, 42, 44) directly through network 14 or through secondary network 18. Further, computer 12 may be connected to network 14 through secondary network 18, as illustrated with phantom link line 54. Virtualization process 10 may include one or more user interfaces, such as browsers and textual or graphical user interfaces, through which users 46, 48, 50, 52 may access virtualization process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IFEE 802.11a, 802.11b, 802.11g, 802.11n, 802.11ac, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data mite requests (e.g., a request that content be written to computer 12) and data read requests (e.g., a request that content be read from computer 12).

Data Storage System:

Referring also to the example implementation of FIGS. 2-4 (e.g., where computer 12 may be configured as a data storage system), for example purposes only, computer 12 will be described as being a network-based storage system that includes a plurality of electro-mechanical backend storage devices. However, this is for example purposes only and is not intended to be a limitation of this disclosure, as other configurations are possible and are considered to be within the scope of this disclosure. For example and as discussed above, computer 12 may be a personal computer that includes a single electro-mechanical storage device.

Figure 2:
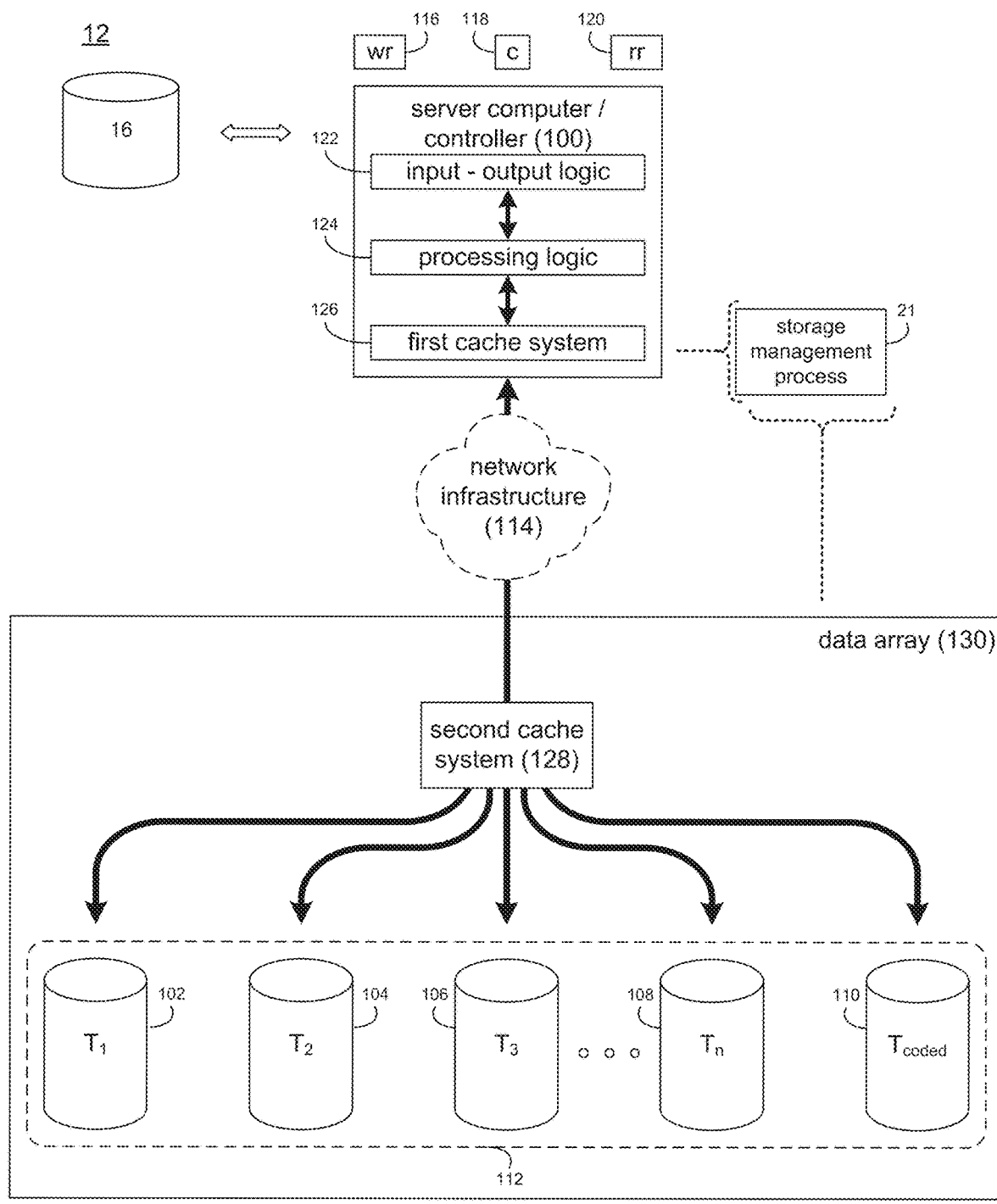
FIG. 2 is an example diagrammatic view of a computer of FIG. 1 according to one or more example implementations of the disclosure.
Figure 3:
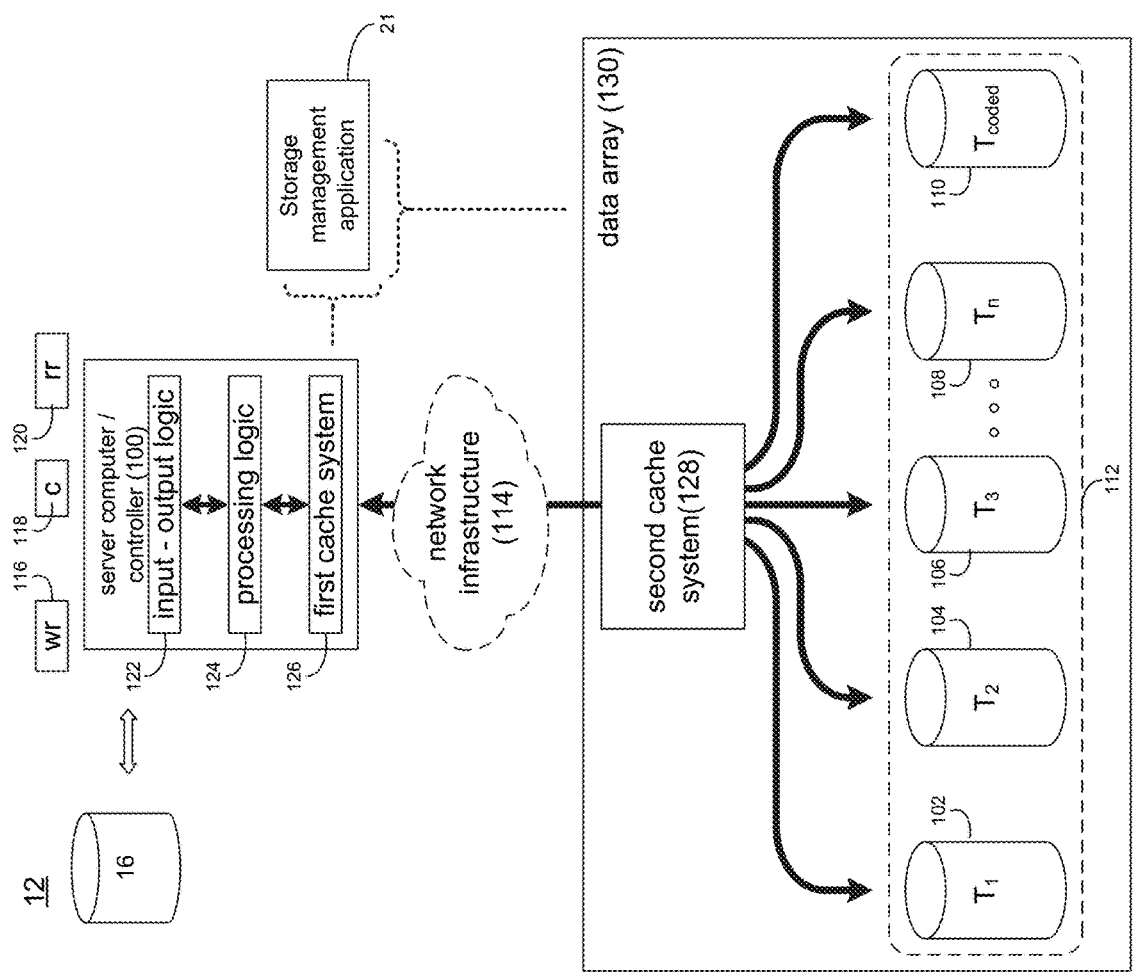
FIG. 3 is an example diagrammatic view of a storage target of FIG. 2 according to one or more example implementations of the disclosure.

Referring also to FIG. 2, computer 12 may include a server computer/controller (e.g. server computer/controller 100), and a plurality of storage targets T1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. In some implementations, one or more of storage targets 102, 104, 106, 108 may be configured as a RAID 0 array, or as a RAID 1 array, in which data is mirrored between storage targets. By mirroring data between storage targets, a level of high availability may be achieved as multiple copies of the data are stored within computer 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3 array, RAID 4 array, RAID 5 array, RAID 6 array, etc.

While in this particular example, computer 12 is shown to include four storage targets (e.g., storage targets 102, 104, 106, 108), this is for example purposes only and is not intended to be a limitation of this disclosure. For example, the actual number of storage targets may be increased or decreased depending upon, e.g., the level of redundancy/performance/capacity desired.

In some implementations, computer 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive (or other storage device drive) that is used to store parity data within a RAID array.

While in this particular example, computer 12 is shown to include one coded target (e.g., coded target 110), this is for example purposes only and is not intended to be a limitation of this disclosure. For example, the actual number of coded targets may be increased or decreased depending upon, e.g., the level of redundancy/performance/capacity desired.

Examples of storage targets 102, 104, 106, 108 and coded target 110 may include one or more electro-mechanical hard disk drives (or other storage device drives), wherein a combination of storage targets 102, 104, 106, 108 and coded target 110 may form non-volatile; electro-mechanical memory system 112.

The manner in which computer 12 is implemented may vary depending upon, e.g., the level of redundancy/performance/capacity desired. For example, computer 12 may be a RAID device in which server computer/controller 100 is a RAID controller card and storage targets 102, 104, 106, 108 and/or coded target 110 are individual "hot-swappable" drives. An example of such a RAID device may include but is not limited to a NAS device. In some implementations, computer 12 may be configured as a SAN, in which server computer/controller 100 may be, e.g., a server computer and each of storage targets 102; 104, 106, 108 and/or coded target 110 may be a RAID device and/or computer-based drive. Further still, one or more of storage targets 102, 104, 106, 108 and/or coded target 110 may be a SAN.

In the event that computer 12 is configured as a SAN, the various components of computer 12 (e.g., server computer controller 100, storage targets 102, 104, 106, 108, and coded target 110) may be coupled using network infrastructure 114; examples of which may include but are not limited to an Ethernet (e.g., Layer 2, or Layer 3) network; a fiber channel network, an InfiniBand network, or any other circuit switched/packet switched network.

Computer 12 may execute all or a portion of storage management process 21 and/or virtualization process 10. The instruction sets and subroutines of storage management process 21, which may be stored on a storage device (e.g., storage device 16) coupled to server computer/controller 100, may be executed by one or more processors and one or more memory architectures included within server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. I/O request 15) may be generated. For example, these I/O requests may be sent from client applications 22, 24, 26, 28 to computer 12. Additionally/alternatively and when server computer/controller 100 is configured as an application server, these I/O requests may be internally generated within server computer/controller 100. Examples of I/O request 15 may include but are not limited to data write request 116 (e.g., a request that content 118 be written to computer 12) and data read request 120 (e.g., a request that content 118 be read from computer 12).

Server computer/controller 100 may include input-output logic 12 (e.g., a network interface card or a Host Bus Adaptor (HBA)), processing logic 124, and first cache system 126. Examples of first cache system 126 may include but are not limited to a volatile, solid-state, cache memory system (e.g., a dynamic RAM cache memory system) and/or a non-volatile, solid-state, cache memory system (e.g., a flash-based, cache memory system).

During operation of server computer/controller 100, content 118 to be written to computer 12 may be received by input-output logic 122 (e.g., from network 14 and/or network 18) and processed by processing logic 124 (e.g., via storage management application 21). Additionally/alternatively and when server computer/controller 100 is configured as an application server, content 118 to be written to computer 12 may be internally generated by server computer/controller 100 (e.g., via storage management application 21). As will be discussed below, processing logic 124 may initially store content 118 within first cache system 126.

Depending on the manner in which first cache system 126 is configured, processing logic 124 may immediately write content 118 to second cache system 128/non-volatile, electro-mechanical memory system 112 (e.g., if first cache system 126 is configured as a write-through cache) or may subsequently write content 118 to second cache system 128/non-volatile, electro-mechanical memory system 112 (e.g., if first cache system 126 is configured as a write-back cache). Additionally, and in some configurations, processing logic 124 (e.g., via storage management application 21) may calculate and store coded data on coded target 110 (included within non-volatile, electromechanical memory system 112) that may allow for the regeneration of data lost/corrupted on one or more of storage targets 102, 104, 106, 108. For example, if processing logic 124 was included within a RAID controller card or a NAS/SAN controller, processing logic 124 may calculate and store coded data on coded target 110. However, if processing logic 124 was included within, e.g., an applications server, data array 130 may calculate and store coded data on coded target 110.

Examples of second cache system 128 may include but are not limited to a volatile, solid-state, cache memory system (e.g., a dynamic RAM cache memory system) and/or a non-volatile, solid-state, cache memory system (e.g., a flash-based, cache memory system).

The combination of second cache system 128 and non-volatile, electromechanical memory system 112 may form data array 130, wherein first cache system 126 may be sized so that the number of times that data array 130 is accessed may be reduced. Accordingly, by sizing first cache system 126 so that first cache system 126 retains a quantity of data sufficient to satisfy a significant quantity of I/O requests (e.g., IO request 15), the overall performance of computer 12 may be enhanced.

Further, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of I/O requests (e.g., I/O request 15), the overall performance of computer 12 may be enhanced.

As discussed above, the instruction sets and subroutines of storage management application 21, which may be stored on storage device 16 included within computer 12, may be executed by one or more processors and one or more memory architectures included within computer 12, Accordingly, in addition to being executed on server computer/controller 100, some or all of the instruction sets and subroutines of storage management application 21 may be executed by one or more processors and one or more memory architectures included within data array 130.

Figure 4:
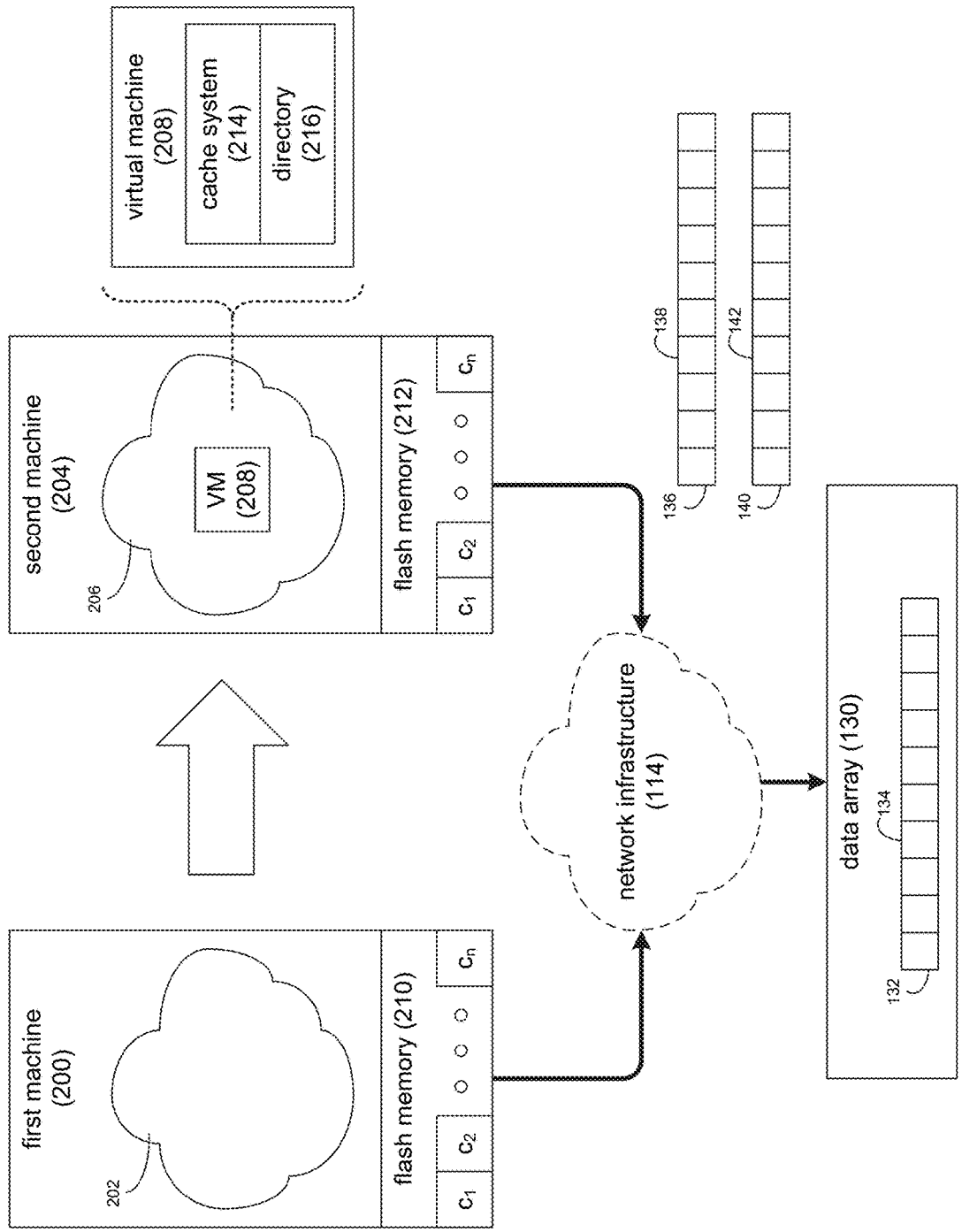
FIG. 4 is an example diagrammatic view of a storage system layout according to one or more example implementations of the disclosure.
Figure 5:
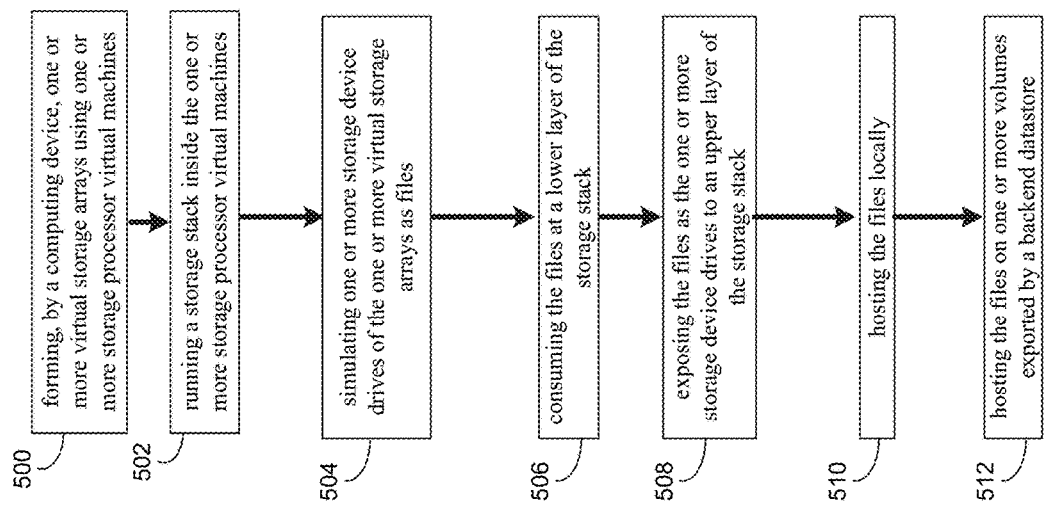
FIG. 5 is an example flowchart of a virtualization process according to one or more example implementations of the disclosure.
Figure 6:
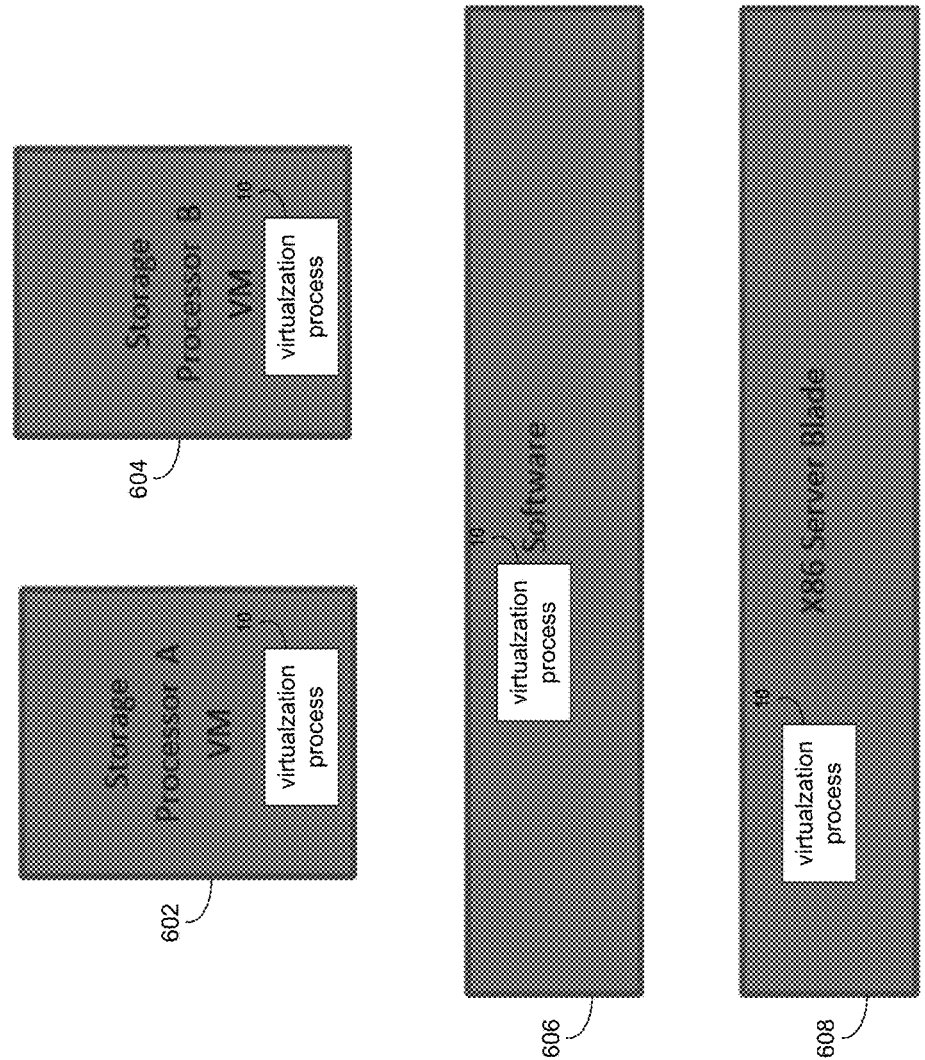
FIG. 6 is an example diagrammatic view of an example storage VM sitting on top of a server according to one or more example implementations of the disclosure.

Referring also to the example implementation of FIG. 4, assume for the following example that first server computer/controller 200 is a physical device that is executing first virtual machine operating environment 202. An example of such a virtual machine operating environment may be a hypervisor, which is an instantiation of an operating system that allows for multiple virtual machines to operate within a single physical device (e.g., first server computer/controller 200). Further, second server computer/controller 204 may be a physical device that is executing second virtual machine operating environment 206 (e.g., a hypervisor).

For this example, further assume that first virtual machine operating environment 202 within first server computer/controller 200 is executing a virtual machine (e.g., virtual machine 208), While first virtual machine operating environment 202 is shown to be executing only a single virtual machine; this is for illustrative purposes only and is not intended to be a limitation of this disclosure, as the number of virtual machines executed within first virtual machine operating environment 202 may increase/decrease depending upon need/loading.

Assume further that first server computer/controller 200 and second server computer/controller 204 each includes a non-volatile memory system (e.g., flash memory devices 210, 212, respectively) that first server computer/controller 200 and second server computer/controller 204 may use for cache storage. Each of flash memory devices 210, 212 may be compartmentalized (e.g., into "n" portions, wherein a unique portion of flash memory device 210 may be assigned to each virtual machine running on first virtual machine operating environment 202 and a unique portion of flash memory device 212 may be assigned to each virtual machine running on second virtual machine operating environment 206.

Virtual machine 208 may be associated with cache system 214, which may include content directory 216. Accordingly, virtual machine 208 may use cache system 214, which may be implemented using flash memory device 210. Content directory 216 may be configured to identify the location of specific pieces of content included within (in this example) flash memory device 210 and their corresponding pieces of data within data array 130.

Assume for example purposes only that data file 132 is stored within data array 130. Further assume that data file 132 is a larger data file, examples of which may include larger database files.

Accordingly, in the event that a read request (e.g., read request 120) is received on a host (e.g., server computer/controller 200) concerning data file 130, it may be impractical (e.g., from a performance perspective and/or from a capacity perspective) to cache the entirety of data file 132 within the cache system (e.g., cache system 214) of the host (e.g., server computer/controller 200). Accordingly, data file 132 may be configured as a multi-portion data file in which only the portion of the data file requested by a specific host (e.g., server computer/controller 200) is cached within the cache system (e.g., cache system 214) of the host (e.g., server computer/controller 200) upon the processing of read request 120).

For example, and concerning read requests, assume that read request 120, which may be processed by server computer/controller 200, requests a specific one megabyte portion of data file 132. (e.g., portion 134). Accordingly, the host (e.g., server computer/controller 200) may retrieve from data array 130 only portion 134 of data file 132, which may be stored within the cache system (e.g., cache system 214) of the host (e.g., server computer/controller 200) and provided to the entity requesting portion 134 of data file 132.

Further, write requests (e.g., write request 116) received on a host (e.g., server computer/controller 200) concerning data file 132 may be configured so that the data (e.g., content 118) associated with the write request (e.g., write request 116) only represents a specific portion (e.g., portion 134) of data file 132 that is to be written to data array 130.

For example, and concerning write requests, assume that write request 116, which is processed by server computer/controller 200, requests that a one megabyte portion of data file 132 (e.g., content 118) be written to data array 130. Accordingly, the host (e.g., server computer/controller 200) may receive content 118, which may be stored within the cache system (e.g., cache system 214) of the host (e.g., server computer/controller 200) and provided to data array 130 for storage as e.g., portion 134 of data file 132.

Referring also to the example implementation of FIG. 4, storage management application 21 may associate 250 a tracking file (e.g., tracking file 136) with data file 132. Tracking file 136 may be stored on data array 130. Additionally/alternatively, tracking file 136 may be locally cached on the physical machine processing the write request (e.g., server computer/controller 200), wherein the locally cached copy of tracking file 136 may be modified and then (once the modification is complete) the modified copy of tracking file 136 may be provided to data array 130 so that it may overwrite the original (e.g., unmodified) version of tracking file 136 included within data array 130.

Tracking file 136 may be configured to indicate the status of each portion of data file 132. For example, tracking file 136 may be configured so that tracking file 136 indicates if changes were made to a specific portion of data file 132 (e.g., due to the processing of write request 116) and the identity of the host (e.g., server computer/controller 200) that made those changes. For example, assume for example purposes that data file 132 is divided into ten portions. Accordingly, tracking file 136 may be configured to include ten 8-bit indicators, wherein a unique 8-bit indicator is assigned to each of the ten portions of data file 132. In the event that a change is made to one of the ten portions of data file 132, the unique 8-bit indicator that is assigned to the changed portion of data file 132 may be updated to indicate the identity of the host (e.g., first machine 200) that made the change. As in this example, the indicators are eight bits in length, two-hundred-fifty-six unique hosts may be identified within each unique 8-bit indicator.

Continuing with the above-stated example, assume that server computer/controller 200 processes write request 116. Accordingly, storage management application 21 may modify 252 the appropriate portion of data file 132. For example, storage management application 21 may overwrite portion 134 of data file 132 to include content 118 defined within write request 116. As, in this example; server computer controller 200 is executing first virtual machine operating environment 202 (which is executing virtual machine 208), virtual machine 208 may modify 252 the appropriate portion of data file 132.

Further, storage management application 21 may update 254 tracking file 136 to reflect the modification of the appropriate portion of data file 132. For example, storage management application 21 may update 254 unique 8-bit indicator 138 (that is associated with portion 134 of data file 132) to indicate that portion 134 of data file 132 was modified by (in this example) server computer controller 200.

Assume that for some reason (e.g., maintenance load balancing), storage management application 21 receives an indication, on virtual machine 208, that virtual machine 208 is going to be migrated. Specifically, through the use of products like VMware, virtual machines may be migrated (from a first physical device to a second physical device) without being shut down (which is commonly referred to as a live migration or vmotion).

Generally, storage array may consists of drives of various sizes and count. As the configuration size increases (e.g., both in terms of number of the drives and size of the drives) it may get costly and time consuming to acquire systems of large drive count and high drive sizes, e.g., in order to simulate hardware to test software, such as testing the limit, memory consumption and other software functionality on these arrays. As will be discussed below, virtualization process 10 may enable the simulation of "visible" hardware for software testing on arrays without actually requiting the acquisition and setup of a large physical configurations. For instance, currently, it may be required that file sizes be the size of the storage device being tested, which may mean more storage is needed for simulation, e.g., 16 TB storage device may require 16 TB file.

As will be discussed below, virtualization process 10 may at least help, e.g., improvement data storage technology, necessarily rooted in computer technology in order to overcome an example and non-limiting problem specifically arising in the realm of storage systems associated with, e.g., simulating storage arrays. For example, virtualization process 10 may be used, e.g., to help with quicker and cheaper testing of large hardware configurations simulating large configuration arrays of various drive sizes and counts, but may be extended to other aspects of virtual systems.

The Virtualization Process:

As discussed above and referring also at least to the example implementations of FIGS. 5-8, virtualization process 10 may form 500, by a computing device, one or more virtual storage arrays using one or more storage processor virtual machines. Virtualization process 10 may run 502 a storage stack inside the one or more storage processor virtual machines. Virtualization process 10 may simulate 504 one or more storage device drives of the one or more virtual storage arrays as files.

In some implementations, virtualization process 10 may form 500, by a computing device, one or more virtual storage arrays using one or more storage processor virtual machines. For example, and referring also to the example implementation of FIG. 6, there is shown a diagrammatic view of an example high level block diagram 600 of a storage VM (e.g., via storage processor 602/604) sitting on top of a server (e.g., ESX server). In the example, the system may include metal hardware, such as but not limited to any x86 server blade 608 (or otherwise). The example software 606 (e.g., ESX software or other appropriate type of software) may (e.g., via virtualization process 10) interface and manage the hardware (e.g., CPU, Memory, I/O Module, etc.) and may provide the environment for applications to runs on. In some implementations, all of the storage software may run (e.g., via virtualization process 10) inside at least one of the VMs that run on the example software 606. In the example, the two storage processor VMs may (e.g., via virtualization process 10) form 500 a virtual storage array, however, it will be appreciated that more or less VMs may be used. In some implementations, multiple storage arrays may be run on software 606. Generally, in an actual hardware based storage array, there may be two x86 blades and the storage software may runs on, e.g., Linux, which may directly run on the hardware, and the two x86 blades may be attached to storage device enclosures that provide the physical storage, however, more or less blades may be used.

In some implementations, virtualization process 10 may run 502 a storage stack inside the one or more storage processor virtual machines. For instance, and referring at least to the example implementation of FIG. 7, a high level block diagram of a storage stack 700 is shown. In the example, storage stack 700 is running 502 (e.g., via virtualization process 10) inside the VM, whereas in traditional storage arrays storage stack 700 may be running on the actual hardware itself. Since VM may be considered generally as a software container the code runs on, the VM itself may run on any computing device, e.g., desktop or any standard server blade, etc. and so many VMs may run in parallel giving the ability to easily get a VM for anybody who wants to test the changes (e.g., via virtualization process 10) or even do code development. In contrast, if run on hardware, propriety hardware blades and costly drives may be required. Additionally, deploying the hardware may take time and money, whereas a VM may be deployed and torn down easily and quickly, thus having VM save both time and money from a development perspective In some implementations, software stack 700 may be simulated on a VM using files to simulate disks (or other storage devices) and the current disk may be files that comes from local storage, which may generally be limited to size in, e.g., 10s or 100s of GBs. However, as will be discussed below, virtualization process 10 may instead simulate 504 one or more storage device drives of the one or more virtual storage arrays as files. By doing so, virtualization process 10 may enable the files to be used for, e.g., 10s or 100s of TB, and without using actual space. In some implementations, the files may include thin files. For instance, in the example, since the storage device drives of the virtual storage arrays are simulated 504 as thin files, virtualization process 10 may also have 1000's of drives of the size and type desired without physically requiring the drives. A thin file may generally be described as a file that, when created to be of particular size (e.g., 1 TB), will not actually take 1 TB of storage space. So from user perspective, that file will be shown to be 1 TB size, but will actually take a very small fraction of storage space. The thin file may then start growing in storage space when, e.g., a user starts to write to that thin file.

Figure 7:
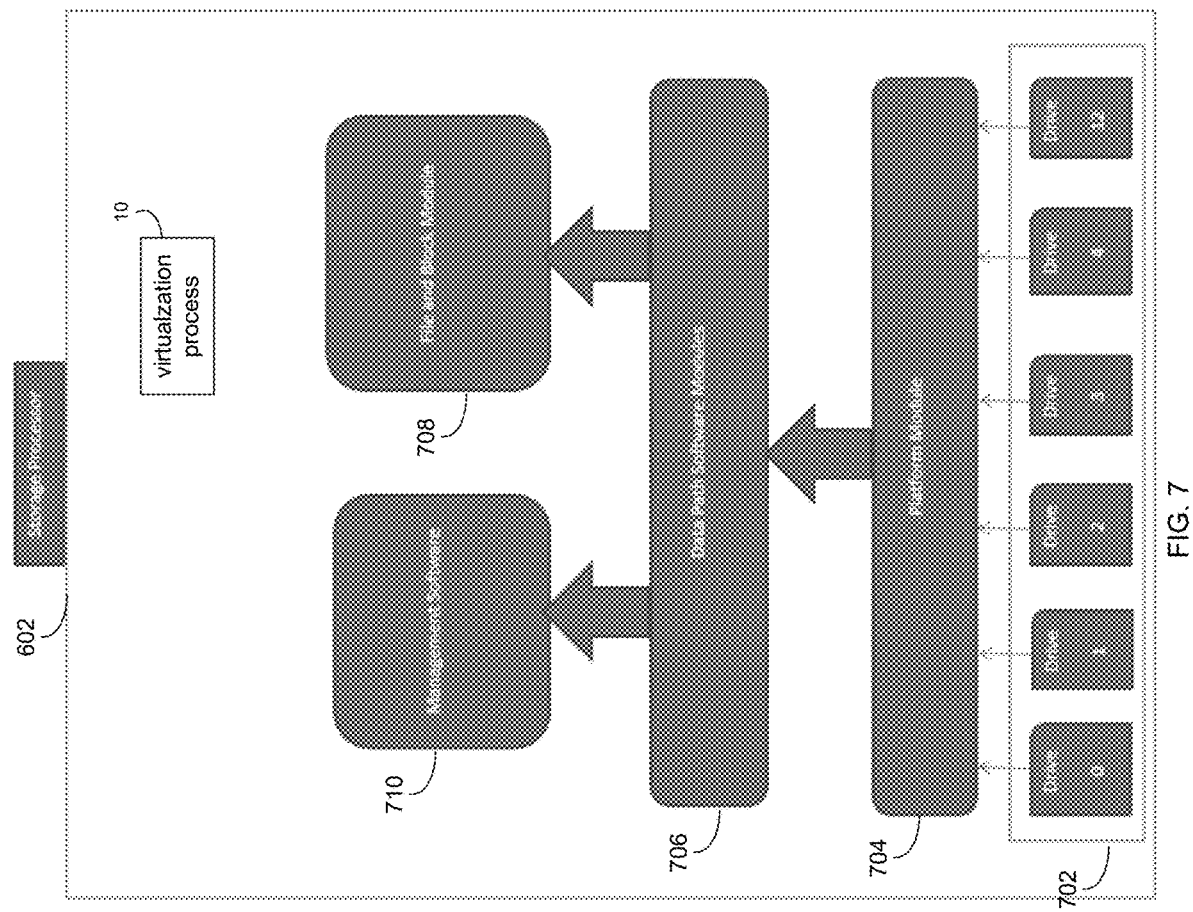
FIG. 7 is an example diagrammatic view of an example storage stack according to one or more example implementations of the disclosure.
Figure 8:
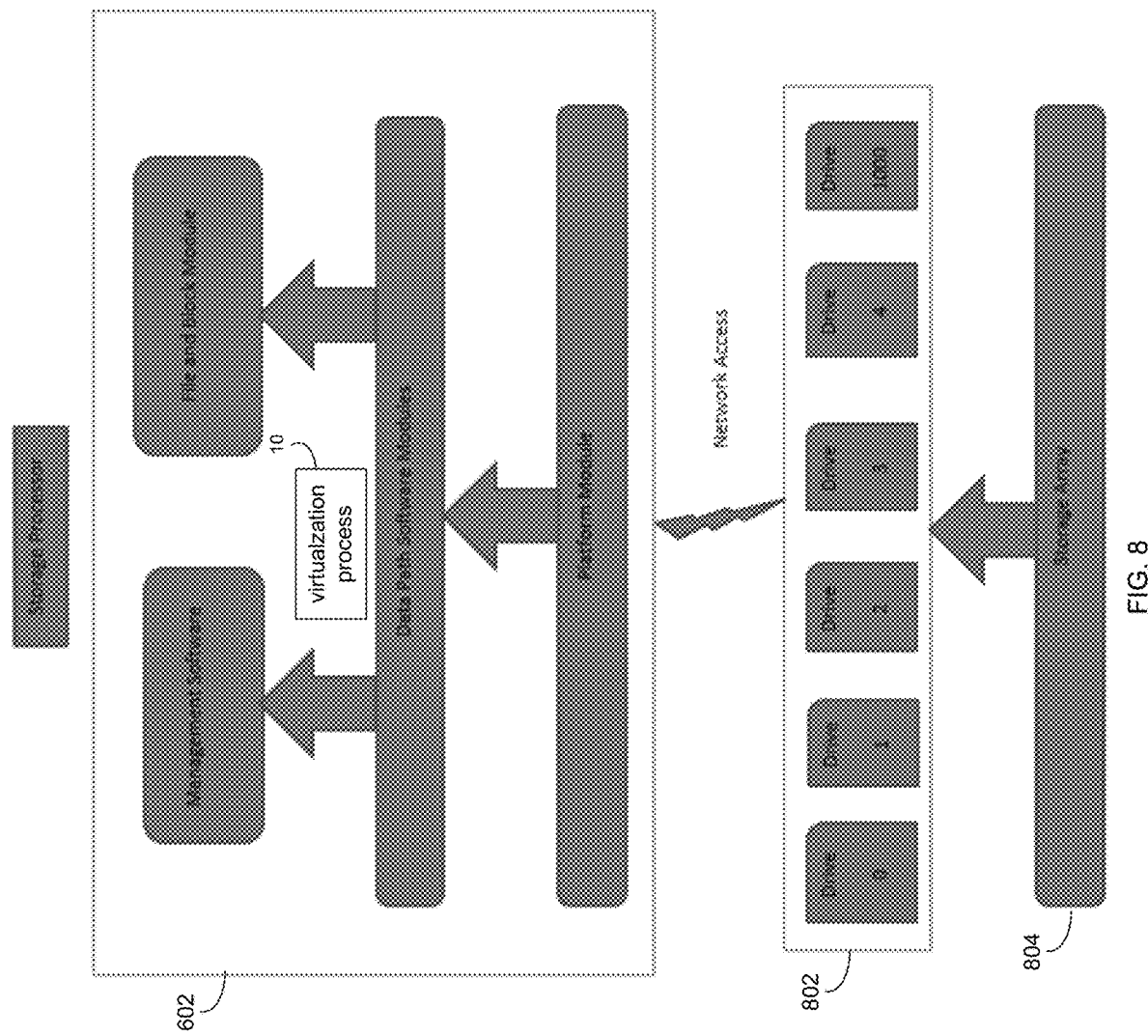
FIG. 8 is an example diagrammatic view of a storage system layout according to one or more example implementations of the disclosure.

In some implementations, and referring still to FIG. 7, the files simulating 504 the one or more storage device drives may be stored in a server. For example, the drives (e.g., drives 702) shows that drives 702 are actually files that may be stored in the server 608 itself, such that both the storage VMs (e.g., via virtualization process 10) may have access to it.

For instance, in some implementations, the files may be consumed 506 by virtualization process 10 at a lower layer of the storage stack, and in some implementations, the files may be exposed 508 by virtualization process 10 as the one or more storage device drives to an upper layer of the storage stack. For example, the bottom most layer on platform module 704 of virtualization process 10 may consume 506 the files and may expose 508 the files as drives to the upper layers. In some implementations, the upper layers may not know or care if the storage is from a file or from actual physical drives. For instance, data path software module 706 of virtualization process 10 may consumes 506 the drives and may provide the storage aspects to the file and block module 708 of virtualization process 10, which may expose 508 to the end user file based storage or block based storage. As a result, virtualization process 10 may enable having multiple virtual storage arrays on the same underlying hardware without using physical drives. In some implementations, management software module 710 of virtualization process 10 may be used to manage the storage the array, e.g., monitoring of components, provisions storage and configuration of the storage array.

In some implementations, virtualization process 10 may host 510 the files locally, and/or virtualization process 10 may host 512 the files on one or more volumes exported by a backend datastore. For instance, the files (e.g., the thin files simulating the storage device drives of the virtual storage arrays) may be either hosted 510 locally on the VM, and/or may be hosted 512 on a SAN network exported by a backend store. For example, and referring at least to the example implementation of FIG. 8, an example storage layout 800 is shown. In the example, it may be seen that the thin files simulating the storage device drives of the virtual storage arrays now reside on volumes (e.g., volume 802) exported (e.g., via virtualization process 10) by external storage (e.g., storage array 804) and the VM (e.g., storage processor A VM 602) may access the files over the network.

In some implementations, the configuration setting at the platform level may be setup (e.g., via virtualization process 10) to indicate that the files need to be accessed over the network. In some implementations, by hosting 512 on the backend datastore, I/Os may be run to the files as much as there is backend datastore availability. Thus, the files may be setup by virtualization process 10 to be thin files, so that the files do not take up space upfront. Platform module 704 of virtualization process 10 may know that these files are thin files, and may be enable the compression of data of known patterns to reduce the load on the files.

While one or more examples have been described as simulating hard disk drives, other storage device drives may also be simulated without departing from the scope of the disclosure. For example, virtualization process 10 may enable use of configuration files (e.g., at the platform level) that may simulate 500 any drive types (e.g., SSD, SAS HDD, NL-SAS HDD, etc.).

Accordingly, in some implementations, virtualization process 10 may simulate drives of various types, sizes or count quickly, and since the simulations may be involving VMs, automation of the creation of storage configurations that the user may want and/or tear down may be simplified, making it efficient and cheap to validate large configuration arrays. For instance, if, for example, the purpose is to test hardware limits, memory consumption or other software feature that do not run heavy I/Os, then space taken up by these may be minimum. As mentioned, regarding drives 702 and volume 802, the files that are created may be treated as drives, e.g., a layer of software in the platform may take the properties of the file and convert it as disks (or other storage device) to the upper layers. The upper layers generally do not know that it is interfacing with files instead of disks. The file being thin as mentioned above, may (e.g., via virtualization process 10) report as though they are 1 TB or 16 TB, even though they only take a fraction of that space. Since the upper layers of virtualization process 10 may see it as talking to drives, the software code may be tested in this environment efficiently, and without costly use of hardware (e.g., blades and disks). For instance, using the present disclosure, software code may be tested to make sure the code is handling the drive limits and inherent use of memory limits to support such a large configuration of drives and its sizes, without actually requiring the amount of hardware that would be required to test the software code "in reality."

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   forming, by a computing device, one or more virtual storage arrays using one or more storage processor virtual machines;
   running a storage stack inside the one or more storage processor virtual machines; and
   presenting one or more files as one or more physical storage device drives of the one or more virtual storage arrays, wherein the files include thin files with reported storage capacities representative of the storage capacities of the one or more physical storage device drives and with actual storage capacities less than the storage capacities of the one or more physical storage device drives, wherein the files include configuration files configured to present one or more storage device types for the one or more physical storage device drives, the one or more storage device types including one or more of a solid-state drive and a hard disk drive for the one or more physical storage device drives; and
   generating one or more tracking files for one or more data files stored on the one or more files, wherein the one or more tracking files are configured to indicate if one or more changes are made to the one or more data files and to identify a host that made the one or more changes to the one or more data files.

2. The computer-implemented method of claim 1 wherein the files presented as the one or more physical storage device drives are stored in a server.

3. The computer-implemented method of claim 1 further comprising consuming the files at a first layer of the storage stack, wherein the first layer is lower than at least one other layer in the storage stack.

4. The computer-implemented method of claim 3 further comprising exposing the files as the one or more storage device drives to a second layer of the storage stack, wherein the second layer is higher than at least the first layer in the storage stack.

5. The computer-implemented method of claim 1 further comprising hosting the files locally on the one or more storage processor virtual machines.

6. The computer-implemented method of claim 1 further comprising hosting the files on one or more volumes exported by a backend datastore.

7. The computer-implemented method of claim 1 wherein the one or more tracking files include a unique indicator associated with each portion of a plurality of portions of the one or more data files.

8. A computer program product residing on a non-transitory computer readable storage medium having a plurality of instructions stored thereon which, when executed across one or more processors, causes at least a portion of the one or more processors to perform operations comprising:
   forming one or more virtual storage arrays using one or more storage processor virtual machines;
   running a storage stack inside the one or more storage processor virtual machines; and
   presenting one or more files as one or more physical storage device drives of the one or more virtual storage arrays, wherein the files include thin files with reported storage capacities representative of the storage capacities of the one or more physical storage device drives and with actual storage capacities less than the storage capacities of the one or more physical storage device drives, wherein the files include configuration files configured to present one or more storage device types for the one or more physical storage device drives, the one or more storage device types including one or more of a solid-state drive and a hard disk drive for the one or more physical storage device drives; and
   generating one or more tracking files for one or more data files stored on the one or more files, wherein the one or more tracking files are configured to indicate if one or more changes are made to the one or more data files and to identify a host that made the one or more changes to the one or more data files.

9. The computer program product of claim 8 wherein the files presented as the one or more physical storage device drives are stored in a server.

10. The computer program product of claim 8 wherein the operations further comprise consuming the files at a first layer of the storage stack, wherein the first layer is lower than at least one other layer in the storage stack.

11. The computer program product of claim 10 wherein the operations further comprise exposing the files as the one or more storage device drives to a second layer of the storage stack, wherein the second layer is higher than at least the first layer in the storage stack.

12. The computer program product of claim 8 wherein the operations further comprise hosting the files locally on the one or more storage processor virtual machines.

13. The computer program product of claim 8 wherein the operations further comprise hosting the files on one or more volumes exported by a backend datastore.

14. A computing system including one or more hardware processors and one or more memories configured to perform operations comprising:
   forming one or more virtual storage arrays using one or more storage processor virtual machines;
   running a storage stack inside the one or more storage processor virtual machines; and
   presenting one or more files as one or more physical storage device drives of the one or more virtual storage arrays, wherein the files include thin files with reported storage capacities representative of the storage capacities of the one or more physical storage device drives and with actual storage capacities less than the storage capacities of the one or more physical storage device drives, wherein the files include configuration files configured to present one or more storage device types for the one or more physical storage device drives, the one or more storage device types including one or more of a solid-state drive and a hard disk drive for the one or more physical storage device drives; and
   generating one or more tracking files for one or more data files stored on the one or more files, wherein the one or more tracking files are configured to indicate if one or more changes are made to the one or more data files and to identify a host that made the one or more changes to the one or more data files.

15. The computer program product of claim 8 wherein the files presented as the one or more physical storage device drives are stored in a server.

16. The computing system of claim 14 wherein the operations further comprise consuming the files at a first layer of the storage stack, wherein the first layer is lower than at least one other layer in the storage stack.

17. The computing system of claim 16 wherein the operations further comprise exposing the files as the one or more storage device drives to a second layer of the storage stack, wherein the second layer is higher than at least the first layer in the storage stack.

18. The computing system of claim 14 wherein the operations further comprise hosting the files at least one of locally on the one or more storage processor virtual machines and on one or more volumes exported by a backend datastore.

* * * * *